US008979281B2

(12) United States Patent
Lassila et al.

(10) Patent No.: US 8,979,281 B2
(45) Date of Patent: Mar. 17, 2015

(54) SYSTEM AND METHOD FOR IMAGINATION PARK TREE PROJECTIONS

(75) Inventors: Neal Lassila, Ventura, CA (US); Jonathan Endicott, Pasadena, CA (US); Charles D. Petersen, Woodland Hills, CA (US); Fred Suffin, Woodland Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 403 days.

(21) Appl. No.: 12/803,226

(22) Filed: Jun. 21, 2010

(65) Prior Publication Data

US 2011/0310310 A1 Dec. 22, 2011

(51) Int. Cl.

| | |
|---|---|
| ***G03B 21/56*** | (2006.01) |
| ***G03B 21/14*** | (2006.01) |
| ***G03B 21/26*** | (2006.01) |
| ***G09G 3/00*** | (2006.01) |

(52) U.S. Cl.

CPC ........ *G09G 3/002* (2013.01); *G09G 2320/0285* (2013.01)

USPC ................................ 353/97; 353/28; 359/450

(58) Field of Classification Search

USPC ................... 353/97, 28, 69, 94, 62, 122, 121; 359/450, 227

See application file for complete search history.

(56) References Cited

U.S. PATENT DOCUMENTS

| | | | | |
|---|---|---|---|---|
| 3,655,262 | A * | 4/1972 | DePalma | 359/453 |
| 4,249,331 | A | 2/1981 | Vernon | |
| 4,367,486 | A | 1/1983 | Eichenlaub | |
| 4,612,219 | A | 9/1986 | Tengs | |
| 4,636,035 | A | 1/1987 | Clausen | |
| 4,806,392 | A | 2/1989 | Dixon | |
| 5,033,843 | A | 7/1991 | Kolff | |
| 5,253,000 | A * | 10/1993 | Stoeckner | 353/46 |
| 5,331,359 | A * | 7/1994 | Leclercq | 353/28 |
| 5,546,198 | A | 8/1996 | Van der Gracht | |
| 5,667,736 | A | 9/1997 | Chien | |

(Continued)

FOREIGN PATENT DOCUMENTS

| | | |
|---|---|---|
| JP | 2007072146 | 3/2007 |
| WO | WO2008095909 A1 | 8/2008 |

OTHER PUBLICATIONS

Blain, Loz, Cool displays: the transparent rear-projections screen. (May 11, 2007) Retrieved from Internet on Aug. 25, 2010 from: <http://www.gizmag.com/go/7612/picture/35803/>.

(Continued)

*Primary Examiner* — William C Dowling
*Assistant Examiner* — Ryan Howard
(74) *Attorney, Agent, or Firm* — Farjami & Farjami LLP

(57) ABSTRACT

There is provided a system and method for multiple sided video projection mapping on arbitrarily shaped objects. By using the same shape data to manufacture the object and to configure the projection mapping onto the object, stray light, reflections, and other distortions can be reduced or eliminated. By constructing the object using a non-opaque layer and a projection coating layer, video content projected onto the object can be seen on multiple sides. Thus, the number of projectors required for multi-sided viewing can be reduced, simplifying deployment and reducing costs. The invention may be of particular use for retail spaces or other public venues where display of image or video content for information, entertainment, or atmosphere enhancement is desirable.

18 Claims, 4 Drawing Sheets

(56) References Cited

U.S. PATENT DOCUMENTS

| | | | |
|---|---|---|---|
| 5,717,844 A | 2/1998 | Lo | |
| 6,273,568 B1 | 8/2001 | Okuyama | |
| 6,765,566 B1 | 7/2004 | Tsao | |
| 7,248,230 B2 | 7/2007 | Piccionelli | |
| 7,270,428 B2 | 9/2007 | Alasaarela | |
| D588,181 S | 3/2009 | Kroll | |
| 7,503,656 B2 | 3/2009 | Monch | |
| 7,611,396 B2 | 11/2009 | Schnuckle | |
| 2002/0105623 A1* | 8/2002 | Pinhanez | 353/69 |
| 2004/0184013 A1* | 9/2004 | Raskar et al. | 353/121 |
| 2006/0181685 A1* | 8/2006 | Hasegawa | 353/69 |
| 2006/0291237 A1 | 12/2006 | Richmond et al. | |
| 2008/0192027 A1 | 8/2008 | Morrison | |
| 2008/0239243 A1* | 10/2008 | Hasegawa et al. | 353/30 |
| 2008/0304018 A1 | 12/2008 | Tanis-Likkel et al. | |

OTHER PUBLICATIONS 2D tree projection (2005) Retrieved from Internet on Aug. 25, 2010 from: <http://www.worldagroforestrycentre.org/sea/Products/AFModels/SExI/userguide/result.htm>.

* cited by examiner

SYSTEM AND METHOD FOR IMAGINATION PARK TREE PROJECTIONS

BACKGROUND OF THE INVENTION

1. Field of the Invention

The present invention relates generally to video projection. More particularly, the present invention relates to video projection onto objects using projection mapping.

2. Background Art

The design of a retail space is not limited to only practical matters such as product placement and customer traffic management. Another primary point of concern is creating an inviting, playful, and relaxing atmosphere that welcomes customers and encourages repeat patronage. To address this concern, retailers may deploy television screens or video projectors that may display entertainment, information, product demonstrations, and other content to entertain and inform customers.

Video projectors in particular allow the flexible use of walls or other features of the retail space to enhance the store atmosphere. Since video projectors may be mounted overhead or otherwise out of reach, the risk of wear and damage to expensive video equipment is reduced, which may be particularly important for retail spaces catering to families and children. The use of video projectors rather than permanent video fixtures also facilitates store layout reorganization, as many video projectors, provide remote adjustment controls allowing easy adjustment of overhead and remotely situated video projectors.

Unfortunately, the process of calibrating video projectors for optimal viewing quality is often a time-consuming and error-prone process. In particular, tailoring video projection to fit arbitrary shapes without light spill often requires extensive trial and error recalibration of the video projector. Furthermore, if video is to be projected on a freestanding object or aisle feature rather than a wall, then at least two or more video projectors are conventionally required to display visuals on all sides of the object, increasing cost and complexity of implementation.

Accordingly, there is a need to overcome the drawbacks and deficiencies in the art by providing a video projection system that can project high quality visuals on all sides of arbitrary shapes while reducing the number of required video projectors.

SUMMARY OF THE INVENTION

There are provided systems and methods for multiple sided video projection mapping on arbitrarily shaped objects, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for multiple sided video projection mapping on arbitrarily shaped objects. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1A:
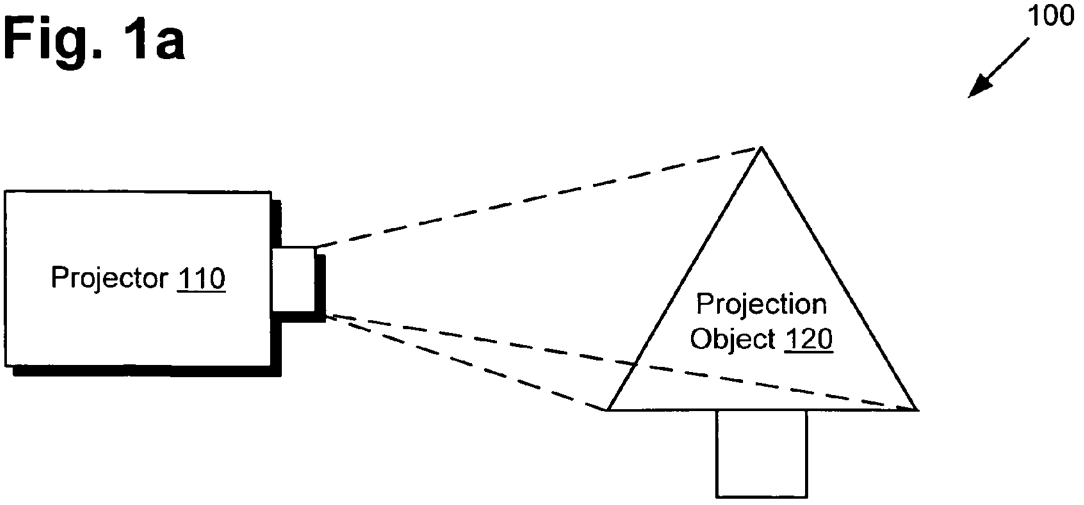
FIGS. 1*a* and 1*b* present diagrams of a projector providing multiple sided video projection mapping onto an arbitrarily shaped object, according to one embodiment of the present invention.
Figure 1B:
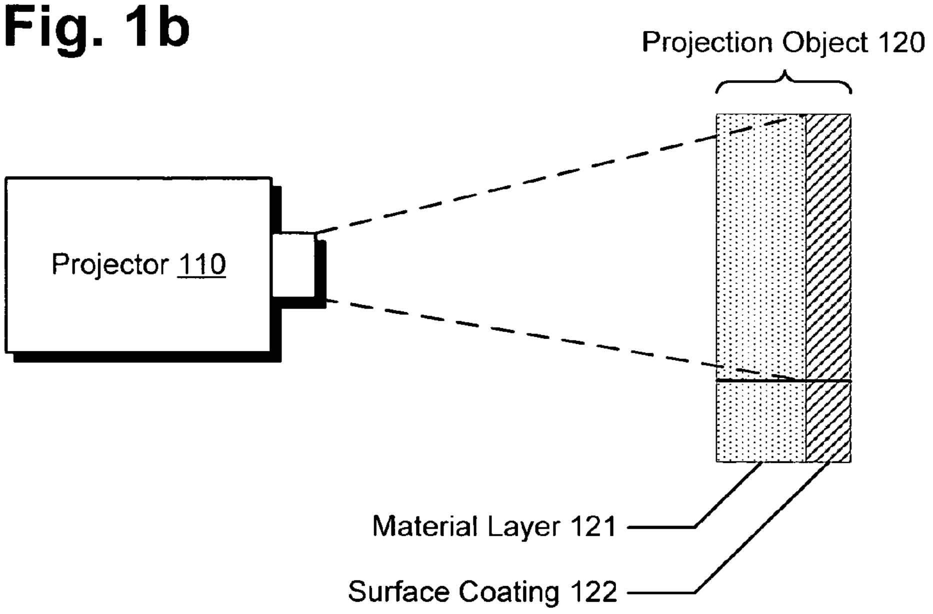

FIGS. 1*a* and 1*b* present diagrams of a projector providing multiple sided video projection mapping onto an arbitrarily shaped object, according to one embodiment of the present invention. Diagram 100 of FIG. 1*a* shows projector 110 projecting video onto projection object 120 from a front view perspective. As seen in FIG. 1*a*, projection object 120 is shaped like a tree, and the video from projector 110 is focused on the crown of the tree. However, in alternative embodiments, any arbitrary shape may be used. Furthermore, while projection object 120 is assumed to provide a flat surface, alternative embodiments may provide a textured or three-dimensional surface. Diagram 100 of FIG. 1*b* shows projector 110 projecting video onto projection object 120 from a side view perspective. As seen in FIG. 1*b*, projection object 120 comprises a flat front material layer 121 and a rear surface coating 122. It should be noted that FIGS. 1*a* and 1*b* are not necessarily drawn to scale.

Projector 110 may comprise, for example, a video projector with remote adjustment control. By adjusting the position, tilt, angle, and other parameters of projector 110, and by applying masking and pre-deformation transforms to projected image content, video content can be displayed precisely without distortion onto a desired surface, such as the crown portion of projection object 120 as shown in FIG. 1*a*.

Moreover, by constructing projection object 120 as shown in FIG. 1*b*, the projected image can be seen on both sides of projection object 120 while using only a single projector 110. Material layer 121 may comprise non-opaque, translucent or transparent materials, such as polypropylene. Surface coating 122 may then be affixed to the rear surface of material layer 121, for example by a chemical treatment or spray-on process. Surface coating 122 may comprise a projection surface coating material that allows viewing from both the front and back. Since material layer 121 is translucent or transparent, a viewer or user from either side of projection object 120 can observe the image projected by projector 110. By configuring projector 110 to project an image precisely onto surface coating 122, users can comfortably view the image projected onto projection object 120 from all sides and at any angle without being blinded or distracted by stray light spill and reflections.

The shape of projection object 120 may be created, for example, by using a computer aided drafting (CAD) program to generate CAD drawing data. By using a CNC (computer numerical controlled) manufacturing process using the generated CAD drawing data, projection object 120 can be created in a precise manner. The same CAD drawing data may then be utilized in conjunction with projector 110 to preprocess image data for precise projection mapping onto projection object 120.

Figure 2:
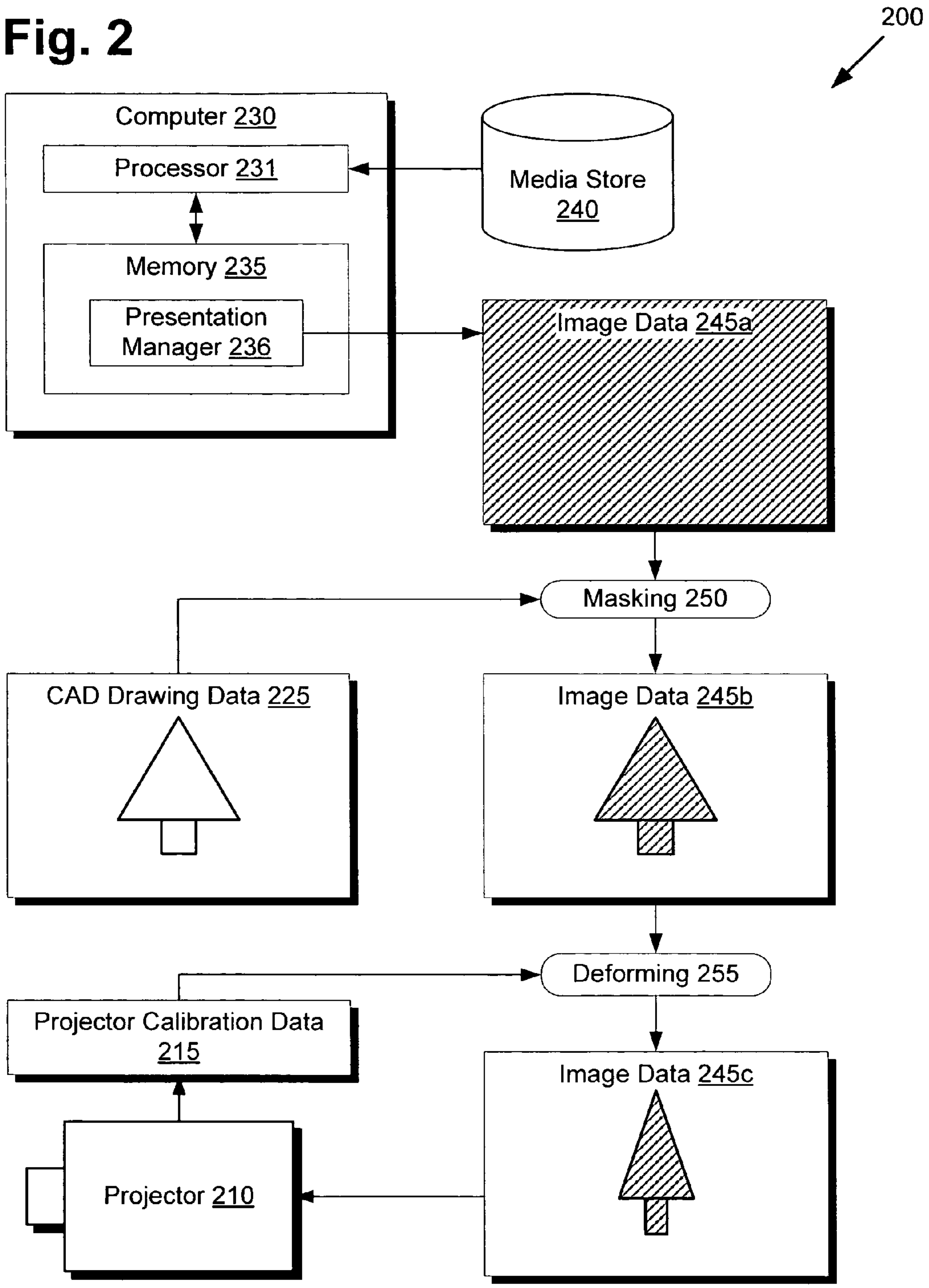
FIG. 2 presents a diagram of image preprocessing for multiple sided video projection mapping on arbitrarily shaped objects, according to one embodiment of the present invention.

Thus, moving to FIG. 2, FIG. 2 presents a diagram of image preprocessing for multiple sided video projection mapping on arbitrarily shaped objects, according to one embodiment of the present invention. Diagram 200 of FIG. 2 includes projector 210, projector calibration data 215, CAD drawing data 225, computer 230, media store 240, image data 245*a* through 245*c*, masking 250, and deforming 255. Computer 230 includes processor 231 and memory 235. Memory 235 includes presentation manager 236. Projector 210 may correspond to projector 110 from FIG. 1.

Media store 240 may comprise, for example, a collection of video media clips, still images, animation data, vector graphics, and other visual imagery for displaying by projector 210. Processor 231 of computer 230 may then execute presentation manager 236 in memory 235, which may retrieve appropriate media from media store 240 for preprocessing and outputting via projector 210. Presentation manager 236 may be controlled remotely, for example through a web accessible interface or through an application for a portable device or mobile phone. Thus, for example, staff of a retail store can control the scheduling of media selected from media store 240 to display media appropriate for particular events, such as grand openings or holiday seasons.

Once the appropriate media assets are retrieved from media store 240, the present frame may be decoded or rendered by presentation manager 236 to create image data 245*a*, as shown in FIG. 2. Presentation manager 236 may then apply the pre-processing step of masking 250 using image data 245*a* and CAD drawing data 225 as a digital mask to create image data 245*b*. For example, all pixels outside of the shape defined by CAD drawing data 225 may be set to black or transparent pixels. Next, presentation manager 236 may apply the step of deforming 255 with image data 245*b* and projector calibration data 215 to create image data 245*c*. This pre-deformation step may be necessary since the view of projector 210 may not be aligned exactly with the boundaries of the object to be projected onto. As such, to account for the positioning, angle, and other parameters which may be stored in projector calibration data 215, image data 245*b* may be processed through the step of deforming 255 to generate image data 245*c*. In this manner, when the image is actually projected, the distortions due to the positioning and configuration of projector 210 relative to the projection object are cancelled out and the result is a distortion free image on the projection object. Presentation manager 236 may repeat the steps shown in FIG. 2 to create the effect of animation by projecting successive frames of image data.

Figure 3:
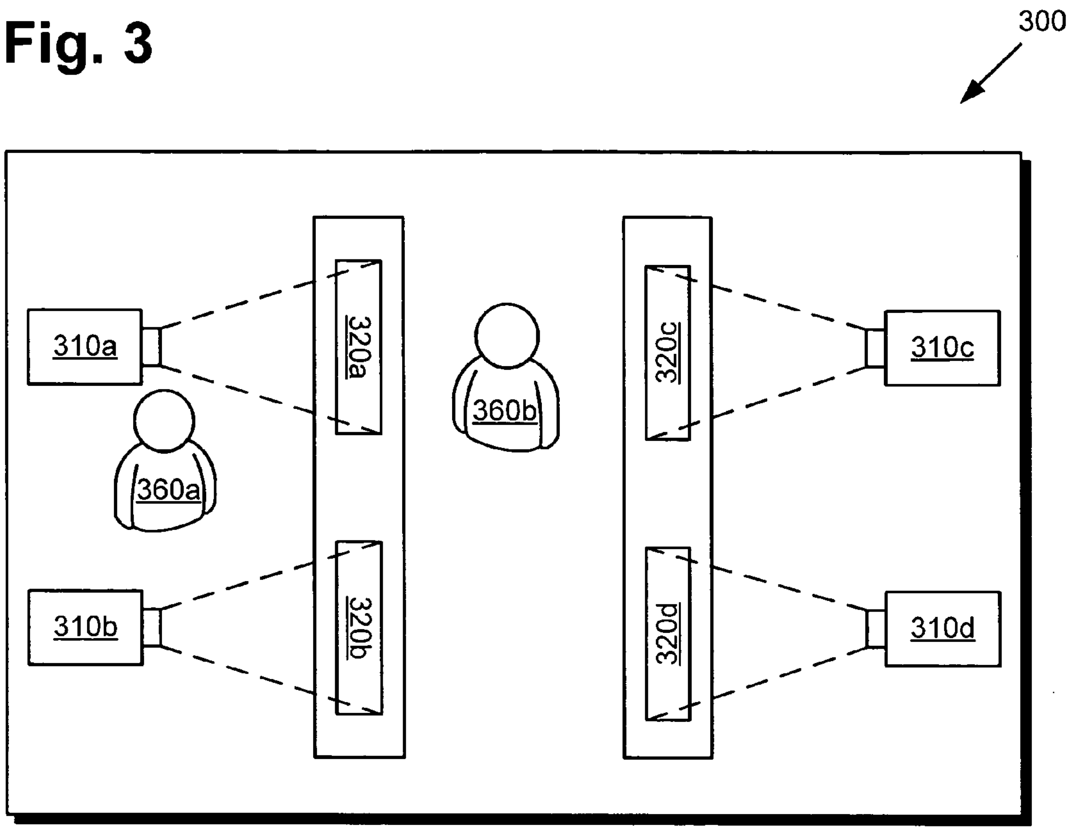
FIG. 3 presents an exemplary layout for a system of multiple sided video projection mapping on arbitrarily shaped objects, according to one embodiment of the present invention.

Moving to FIG. 3, FIG. 3 presents an exemplary layout for a system of multiple sided video projection mapping on arbitrarily shaped objects, according to one embodiment of the present invention. Diagram 300 of FIG. 3 includes projector 310*a* through 310*d*, projection objects 320*a* through 320*d*, and users 360*a* and 360*b*. Projector 310*a* through 310*d* may each correspond to projector 210 from FIG. 2, and projection objects 320*a* through 320*d* may each correspond to projection object 120 from FIG. 1.

As shown in FIG. 3, projectors 310*a* through 310*d* each project onto projection objects 320*a* through 320*d*, respectively. Projectors 310*a* through 310*d* may, for example, be mounted overhead or embedded into walls for unobtrusive integration into a retail space. Projection objects 320*a* and 320*b* are placed on one aisle, whereas projection objects 320*c* and 320*d* are placed on an adjacent aisle. In this manner, video content can be creatively integrated into a retail space using playful and unique shapes, such as tree shapes, as projection objects. While the example layout shown in FIG. 3 uses four projectors to project onto four objects, in alternative embodiments, a single projector may project onto multiple objects, for example if objects are spaced closely or projectors are configured for wide angle projection. Conversely, if a particularly large object is to be projected onto, then multiple projectors may be used to provide a panoramic image onto a single object. Presentation manager 236 of FIG. 2 may then be configured to group multiple projectors into a single virtual canvas, allowing, for example, animations and characters to appear to move from object to object by segmenting image data for multiple projectors.

Thus, by manufacturing the projection objects as described in FIG. 1 and by pre-processing the images shown by the projectors as described in FIG. 2, the number of projectors required for multi-sided viewing may be reduced. As shown in FIG. 3, both user 360*a* and 360*b* can each view the images projected by projector 310*a* and 310*b* onto projection objects 320*a* and 320*b*. Conventionally, this may have required at least four projectors, as two projectors would be required to project on each side of projection objects 320*a* and 320*b*.

Figure 4:
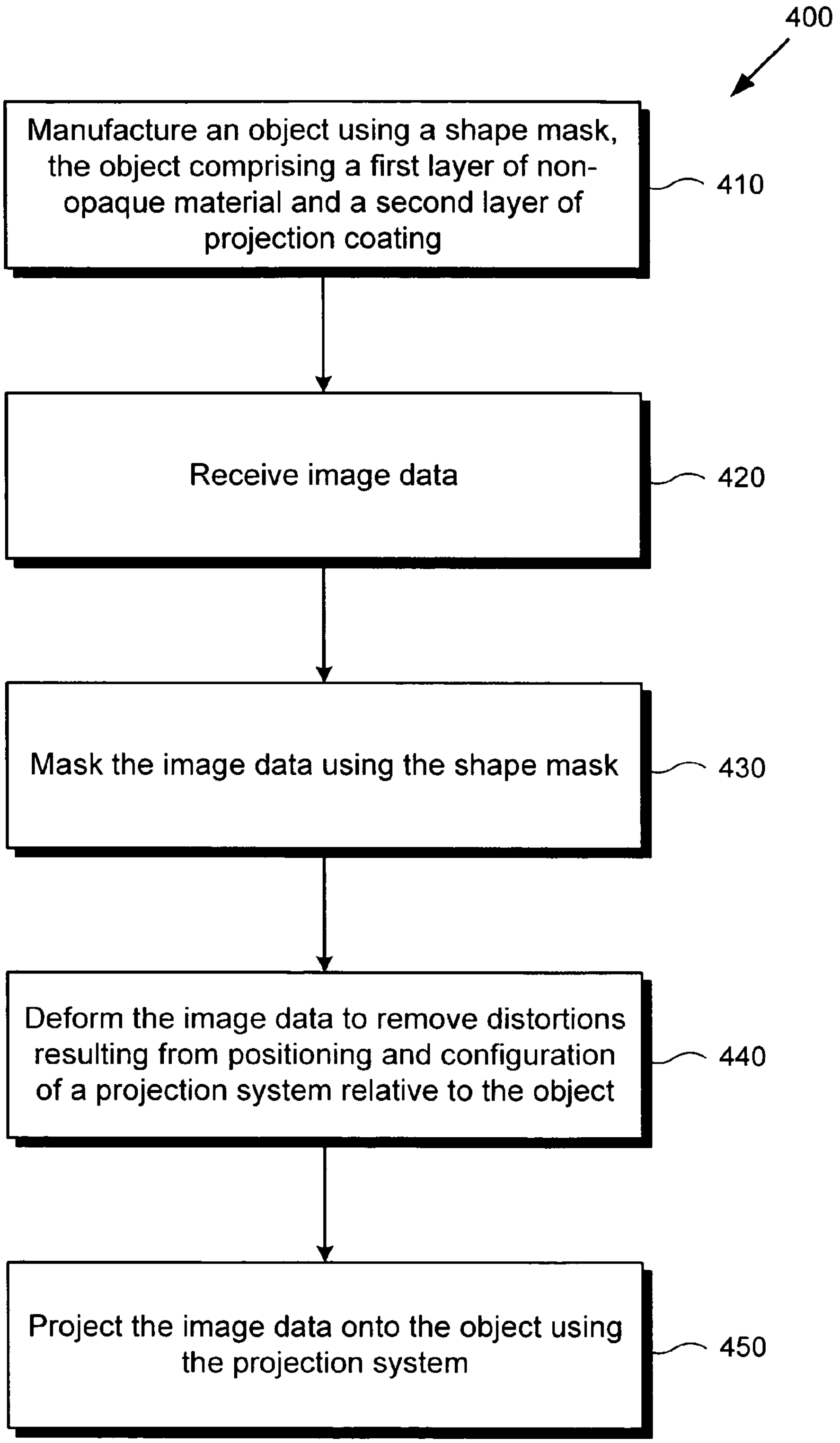
FIG. 4 shows a flowchart describing the steps, according to one embodiment of the present invention, by which multiple sided video projection mapping may be provided for arbitrarily shaped objects.

FIG. 4 shows a flowchart describing the steps, according to one embodiment of the present invention, by which multiple sided video projection mapping may be provided for arbitrarily shaped objects. Certain details and features have been left out of flowchart 400 that are apparent to a person of ordinary skill in the art. For example, a step may comprise one or more substeps or may involve specialized equipment or materials, as known in the art. While steps 410 through 450 indicated in flowchart 400 are sufficient to describe one embodiment of the present invention, other embodiments of the invention may utilize steps different from those shown in flowchart 400.

Referring to step 410 of flowchart 400 in FIG. 4, diagram 100 of FIG. 1, and diagram 200 of FIG. 2, step 410 of flowchart 400 comprises manufacturing projection object 120 using CAD drawing data 225, wherein projection object 120 comprises a first material layer 121 of non-opaque material and a second layer of projection coating or surface coating 122. As previously discussed, a CNC manufacturing process may be utilized to precisely create projection object 120 according to the shape defined by CAD drawing data 225.

Referring to step 420 of flowchart 400 in FIG. 4 and diagram 200 of FIG. 2, step 420 of flowchart 400 comprises processor 231 of computer 230 receiving image data 245*a*. As shown in FIG. 2, presentation manager 236 executing in memory 235 of processor 231 may retrieve visual content from media store 240 and extract or render a frame of image data, or image data 245*a*, for processing and output through projector 210. The visual content may comprise, for example, video media clips, vector animations, still frames, or other content.

Referring to step 430 of flowchart 400 in FIG. 4 and diagram 200 of FIG. 2, step 430 of flowchart 400 comprises processor 231 of computer 230 applying masking 250 to image data 245*a* using CAD drawing data 225. As previously discussed, masking 250 may be carried out by blacking out or making transparent all pixels outside a shape defined by CAD drawing data 225 in image data 245*a*, resulting in image data 245*b*.

Referring to step 440 of flowchart 400 in FIG. 4 and diagram 200 of FIG. 2, step 440 of flowchart 400 comprises processor 231 of computer 230 applying deforming 255 to image data 245*b* using projection calibration data 215. Projection calibration data 215 may contain data such as location, angle, view settings, and other parameters that define the configuration of the projector relative to the object for projection. As previously discussed, this pre-deformation step compensates for distortions caused by the positioning of the projector relative to the object, allowing a distortion free image to be shown.

Referring to step 450 of flowchart 400 in FIG. 4, diagram 100 of FIG. 1, and diagram 200 of FIG. 2, step 450 of flowchart 400 comprises processor 231 of computer 230 projecting image data 245*c* using projector 210, corresponding to projector 110, onto projection object 120. For example, image data 245*c* may be transmitted to projector 210 using a wired or wireless data connection. Projector 110 of FIG. 1 may then project precisely onto projection object 120 for viewing from multiple sides. As previously discussed, alternative embodiments may use multiple projectors for projecting onto a single object, or a single projector for projecting onto multiple objects. As shown by the example layout shown in FIG. 3, users can view and enjoy video content on unique shapes while minimizing the number of projectors for easy and cost effective deployment.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of projecting an image for multiple sided viewing, the method comprising:

generating computer aided drafting (CAD) drawing data during manufacturing of a three-dimensional object, the three-dimensional object having a shape;

receiving image data;

masking the image data to generate masked image data using a digital shape mask corresponding to the shape of the three-dimensional object in the CAD drawing data;

deforming the image using the masked image data and projector calibration data to remove distortions resulting from positioning and configuration of a projection system relative to the three-dimensional object; and projecting the masked image data onto the three-dimensional object using the projection system, the three-dimensional object comprising a first layer of non-opaque material and a second layer of projection coating, wherein the second layer of projection coating allows viewing the image data from both a front and a hack of the three-dimensional object.

2. The method of claim 1 further comprising, prior to receiving the image data, manufacturing the three-dimensional object using the CAD drawing data.

3. The method of claim 2, wherein the manufacturing is by a computer numerical controlled manufacturing process.

4. The method of claim 1, wherein the projection system comprises a video projector.

5. The method of claim 1, wherein the projection system comprises multiple video projectors.

6. The method of claim 1, wherein the shape mask is defined by computer aided drafting (CAD) drawing data.

7. The method of claim 1, wherein the first layer comprises polypropylene.

8. The method of claim 1, wherein the shape mask comprises a tree shape.

9. The method of claim 1, wherein the image data is received from video media.

10. A system of projecting an image for multiple sided viewing, the system comprising:

a three-dimensional object comprising a first layer of non-opaque material and a second layer of projection coating;

a projection system; and a computer having a processor configured to:

generate computer aided drafting (CAD) drawing data during manufacturing of the three-dimensional object, the three-dimensional object having a shape;

receive image data;

mask the image data to generate masked image data using a digital shape mask corresponding to the shape of the three-dimensional object in the CAD drawing data;

deform the image using the masked image data and projector calibration data to remove distortions resulting from positioning and configuration of the projection system relative to the three-dimensional object; and project the masked image data onto the three-dimensional object by using the projection system, wherein the second layer of projection coating allows viewing the image data from both a front and a back of the three-dimensional object.

11. The system of claim 10, wherein prior to receiving the image data, the three-dimensional object is manufactured using the CAD drawing data.

12. The system of claim 11, wherein the manufacturing is by a computer numerical controlled manufacturing process.

13. The system of claim 10, wherein the projection system comprises a video projector.

14. The system of claim 10, wherein the projection system comprises multiple video projectors.

15. The system of claim 10, wherein the shape mask is defined by computer aided drafting (CAD) drawing data.

16. The system of claim 10, wherein the first layer comprises polypropylene.

17. The system of claim 10, wherein the shape mask comprises a tree shape.

18. The system of claim 10, wherein the image data is received from video media.

* * * * *

UNITED STATES PATENT AND TRADEMARK OFFICE

CERTIFICATE OF CORRECTION

PATENT NO. : 8,979,281 B2
APPLICATION NO. : 12/803226
DATED : March 17, 2015
INVENTOR(S) : Neal O. Lassila It is certified that error appears in the above-identified patent and that said Letters Patent is hereby corrected as shown below:

In the Claims

Claim 1, column 6, line 2, "hack" should be changed to --back--

Signed and Sealed this
Eighteenth Day of August, 2015

Michelle K. Lee
*Director of the United States Patent and Trademark Office*